(No Model.)

A. S. RUTHERFORD.
WAX PRODUCT FOR DENTAL OR OTHER PURPOSES.

No. 527,219. Patented Oct. 9, 1894.

Attest:
G. H. Botts
M. C. Pinckney

Inventor
Adrian Spear Rutherford

UNITED STATES PATENT OFFICE.

ADRIAN SPEAR RUTHERFORD, OF NEW YORK, N. Y.

WAX PRODUCT FOR DENTAL OR OTHER PURPOSES.

SPECIFICATION forming part of Letters Patent No. 527,219, dated October 9, 1894.

Application filed July 30, 1891. Serial No. 401,151. (No specimens.)

*To all whom it may concern:*

Be it known that I, ADRIAN SPEAR RUTHERFORD, a citizen of the United States, and a resident of New York, in the county of New York and State of New York, have invented certain new and useful Wax Products for Dental or other Purposes, of which the following is a specification.

This invention has reference to wax preparations.

The object of the invention is to produce sheet wax having certain characteristics which render it of great utility in the arts.

The invention is described hereinafter, and the features for which protection is desired are specified in the claims at the end of this description.

Figure 1:
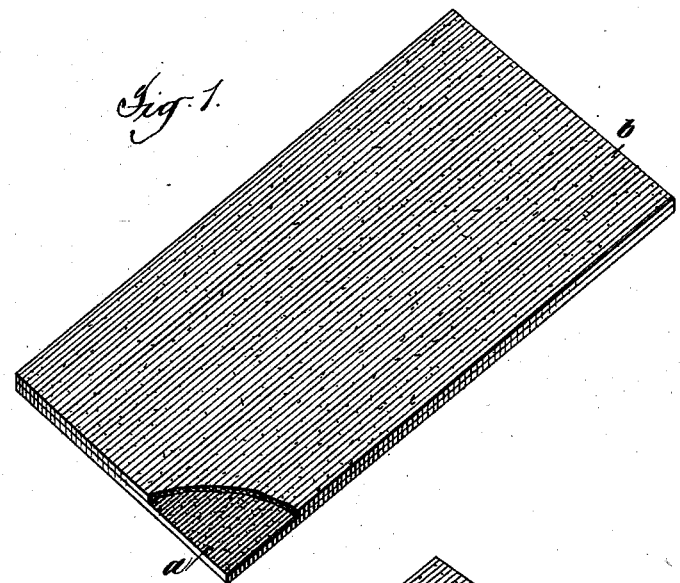
Figure 2:
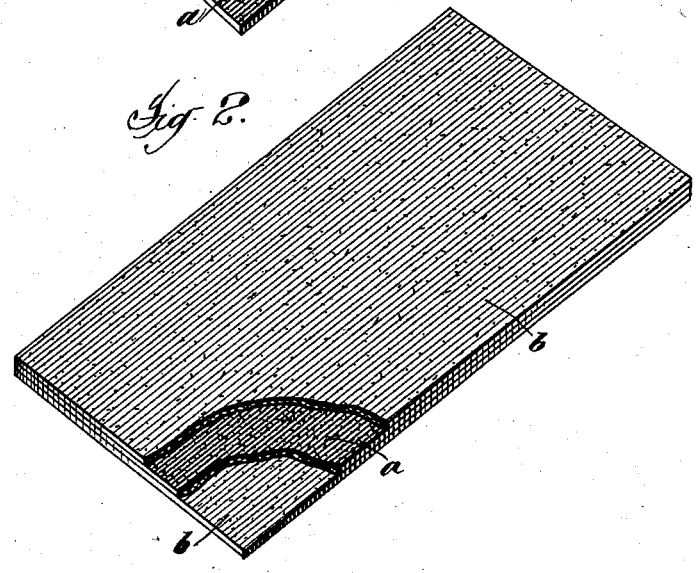

In the accompanying drawings which form part of this specification, and in which the same parts in both views are indicated by the same letters of reference, Figure 1 is a view in perspective of one form of my invention consisting of a sheet comprising two layers of wax, and Fig. 2 is a similar view of my new product composed in this instance of three layers of wax.

I have devised a new article of manufacture consisting of a wax product composed of two or more layers of wax of different degrees of hardness and toughness united together to form a sheet or layer of wax of the same thickness as a single sheet of ordinary sheet-wax of commerce. Sheet-wax of commerce varies in thickness according to the uses to which it is intended to be applied. Where two layers are used one of them will be hard or tough and the other soft; and the layers may be of different colors. Such a product is shown in Fig. 1, wherein *a* indicates the hard layer and *b* the soft layer. In Fig. 2 where three layers of wax are used, the center layer *a* may be of hard wax while the outside layers *b* are of soft wax. The wax may also be arranged in alternate layers of different degrees of hardness and toughness and be composed of different colors.

My wax product will be found useful for a number of purposes. For example, in making trial plates in dentistry, in electrotyping, in making wax flowers, and in taking impressions of articles such as coins, cuts, &c.

*Its use in Dentistry.*—For a number of years great want has been felt for a wax compound for trial-plates that would readily adapt itself to the casts while at the same time be of sufficient hardness so as not to be impaired by the heat of the mouth. Nothing of this kind of a satisfactory nature has as yet been devised. A number of substitutes for the wax, such as "modeling compounds," made in thin sheets, have been devised—but these substances are extremely brittle and being insoluble in water could not be washed out. Trialplates of wax may be successfully washed out, but the objection to the use of wax has been that it is usually too soft or too brittle to permit of the best results. After the case has been banked in flask the necessity of washing out the material used for the trialplate is very essential in order to allow the rubber to flow over the entire surface of the model. In adapting hard wax to the model great risk is run of breaking down the fine rugæ on the cast and also of breaking the plaster teeth; and in removing the hard-wax trial-plate from casts with deep undercuts it is almost certain to break. Furthermore, if the plate should be dropped from the hand it would break in pieces owing to the brittle nature of the wax. While the hard wax will not soften in the mouth, the annoyance caused by its liability to break is such that the dentist is compelled to use the soft wax notwithstanding it will warp, stretch and bend, and in other respects is unsatisfactory.

By my invention the above mentioned difficulties experienced by the dentist have been overcome. By combining in a single sheet, layers of wax compound of different grades of toughness, I produce an article that will readily adapt itself to the cast, will not warp in the mouth and is not liable to break. If by any possibility the hard surface of the combined sheet should crack, the independent soft surface will hold the pieces of the hard surface together.

In utilizing my invention in making wax flowers, the layers of wax comprising the combined wax sheet will be necessarily thin and of such different shades of color as will adapt the finished article to be worked into flowers displaying various shades and tints.

In taking impressions in wax the work is frequently spoiled by the bending of the wax.

By using my wax product the liability of spoiled impression from such cause is much lessened.

I lay no claim to a phonogram-blank composed of a tube of fibrous material, a layer of paraffine or the like on said tube, and an outer layer of wax-like material forming the record-receiving surface, as my invention differs therefrom as set out in the following claims.

Having thus described my invention, what I claim as new, and desire to secure by Letters Patent, is—

1. As a new article of manufacture, a wax product adapted for use in dentistry and for other purposes, the same consisting exclusively of independent layers or sheets of wax of different grades of hardness and toughness united together in a single layer or sheet of the same thickness as a single layer or sheet of ordinary sheet-wax of commerce, substantially as set forth.

2. As a new article of manufacture, a wax product consisting exclusively of independent layers or sheets of wax of different shades or colors, and different grades of hardness or toughness, united together in a single layer or sheet of the same thickness as a single layer or sheet of ordinary sheet-wax of commerce, substantially as set forth.

Signed at New York, in the county of New York and State of New York, this 27th day of July, A. D. 1891.

ADRIAN SPEAR RUTHERFORD.

Witnesses:
J. E. M. BOWEN,
HUGO KOELKER.